(12) United States Patent
Qin et al.

(10) Patent No.: US 12,505,350 B2
(45) Date of Patent: Dec. 23, 2025

(54) ADAPTIVE SELF-ADVERSARIAL NEGATIVE SAMPLING FOR GRAPH NEURAL NETWORK TRAINING

(71) Applicant: International Business Machines Corporation, Armonk, NY (US)

(72) Inventors: Xiao Qin, San Jose, CA (US); Nasrullah Sheikh, San Jose, CA (US); Berthold Reinwald, San Jose, CA (US); Lingfei Wu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 17/161,944

(22) Filed: Jan. 29, 2021

(65) Prior Publication Data

US 2022/0245460 A1 Aug. 4, 2022

(51) Int. Cl.
*G06N 3/088* (2023.01)
*G06N 3/04* (2023.01)

(52) U.S. Cl.
CPC .............. *G06N 3/088* (2013.01); *G06N 3/04* (2013.01)

(58) Field of Classification Search
CPC .......... G06N 3/088; G06N 3/04; G06N 3/042; G06N 3/084
See application file for complete search history.

(56) References Cited

U.S. PATENT DOCUMENTS 10,134,146 B2  11/2018  Saleemi et al.
10,713,794 B1   7/2020  He et al.
2019/0303535 A1* 10/2019 Fokoue-Nkoutche ........................ G06F 17/16
2021/0067549 A1*  3/2021 Chen ....................... G06N 3/084
2021/0110436 A1*  4/2021 Sankar .................. H04L 67/535
2022/0100956 A1*  3/2022 Iwamoto ................ G06F 40/30
2022/0114444 A1*  4/2022 Weinzaepfel ......... G06N 3/084

OTHER PUBLICATIONS

Wang et al. ("Neighborhood Attention Networks With Adversarial Learning for Link Prediction", IEEE, Aug. 24, 2020, vol. 32, No. 8 , pp. 3653-3663) (Year: 2020).*
Wang et al. ("Adaptive Margin Based Deep Adversarial Metric Learning", IEEE 2020) (Year: 2020).*
Wang et al. ("GraphGAN: Graph Representation Learning with Generative Adversarial Nets", 2018, The Thirty-Second AAAI Conference on Artificial Intelligence (AAAI-18)) (Year: 2018).*
Zhang et al. ("Link Prediction Based on Graph Neural Networks", NeurIPS 2018) teaches a function mapping of a subgraph patterns to link existence, thus automatically learning a "heuristic" that suits the current network. (Year: 2018).*

(Continued)

*Primary Examiner* — Imad Kassim
(74) *Attorney, Agent, or Firm* — CHIP LAW GROUP

(57) ABSTRACT

A graph neural network (GNN) training method, system, and computer program product in a graph, include generating, by the computing device, one or more one or more hypothetical edges between two or more nodes of a plurality of nodes of a graph neural network, testing, by the computing device, to determine whether the one or more generated hypothetical edges should be connected by using negative sampling, and permanently connecting, by the computing device, the one or more tested hypothetical edges if the negative sampling indicates the connectivity.

19 Claims, 12 Drawing Sheets

(56) References Cited

OTHER PUBLICATIONS

Hu et al. ("Adversarial Learning on Heterogeneous Information Networks", KDD '19, Aug. 4-8, 2019) (Year: 2019).*

Zheng et al. ("Hardness-Aware Deep Metric Learning", IEEE Mar. 13, 2020 pp. 72-81) (Year: 2020).*

Wang et al. ("Reinforced Negative Sampling over Knowledge Graph for Recommendation", IEEE 2020) (Year: 2020).*

Mel, et al. "The NIST Definition of Cloud Computing". Recommendations of the National Institute of Standards and Technology. Nov. 16, 2015.

Bowman, N. et al.; "Temporal Link Prediction on the Wikilink Graphs Dataset", Department of Computer Science, Stanford University. Oct. 2019.

Authors, et al.: Disclosed Anonymously, "Reinforcement Learning for Fuzzing Testing Techniques", IP.com No. IPCOM000252021D; An IP.com Prior Art Database Technical Disclosure, IP.com Electronic Publication Date: Dec. 13, 2017.

Authors, et al.: Disclosed Anonymously, "Semi-Supervised Classification Using Object Metadata", IP.com No. IPCOM000252345D; An IP.com Prior Art Database Technical Disclosure, IP.com Electronic Publication Date: Jan. 5, 2018.

Authors, et al.: Disclosed Anonymously, "System and Method for Computing Complexity of Neural Network Models", IP.com No. IPCOM000258772D; An IP.com Prior Art Database Technical Disclosure, IP.com Electronic Publication Date: Jun. 12, 2019.

Liu, L. et al.; "Attribute Propagation Network for Graph Zero-Shot Learning", Article in Proceedings of the AAAI Conference on Artificial Intelligence: Apr. 2020.

Mathias, N. et al.; "Graph-Based Relational Learning", NEC Technical Journal/vol. 14 No. 1/Special Issue on AI and Social Value Creation, Jan. 2020.

Zhang, M. et al.; "Link Prediction Based on Graph Neural Networks", Department of CSE Washington University in St. Louis, $32^{nd}$, Conference on Neural Information Processing System (NeurIPS 2018), Montreal, Canada.

Mikolov, T., et al., Distributed Representations of Words and Phrases and their Compositionality, arXiv:1310.4546v1 [cs.CL], Oct. 16, 2013, 9 pages.

* cited by examiner

FIG. 4 label

1 ●─────Sp─────● score($s_p$) = 0.9

0 ●─────Sn─────● score($s_n$) = 0.2

Adaptive Self-adversarial (ASA) negative sampling: $\text{argmin } |\text{score}(s_n) - \text{score}(s_p) - c|$ where c is a constant

| | | | adaptive self-adversarial | | |
|---|---|---|---|---|---|
| positive | ———————— | 0.6 | | | |
| negative | ················ | | negative | ———————— | 0.9 |
| negative | ················ | | negative | ———————— | 0.8 |
| negative | ················ | | negative | ———————— | 0.78 |
| negative | ················ | | negative | ———————— | 0.1 |
| negative | ················ | | negative | ———————— | 0.05 |
| negative | ················ | | negative | ———————— | 0.04 |
| negative | ················ | | negative | ———————— | 0.03 |
| negative | ················ | | | | |

FIG. 5 score($s_n$)        label all possible negative samples for a $s_p$ candidate pool 0.8    ●--------●   0
0.6    ●--------●   0
0.5    ●--------●   0
0.4    ●--------●   0
0.3    ●--------●   0
0.3    ●--------●   0

```
                        Pseudocode
Input: Graph G

1. Initialize GNN model M
2. while in training epoch:
3.      node embeddings E = M(G)
4.      if current epoch < threshold:
5.          negative samples = random sampler(G)
6.      else:
7.          negative samples = ASA(G, E, c, decay)
8.      compute loss
9.      optimize
10.     step
``` positive   ←— — — — —→ negative   ----------------  ⎫
negative   ----------------  ⎬ false negative, i.e., should be positive negative   ----------------  ⎫
negative   ----------------  ⎬ hard negative sample (cause high loss)

negative   ----------------  ⎫
negative   ----------------  ⎬ simple negative sample (cause near 0 loss)
negative   ----------------  ⎭

FIG. 8

|  |  |  | adaptive self-adversarial | | |
|---|---|---|---|---|---|
| positive | ←– – – – –→ | 0.6 | | | |
| negative | -------------- | | negative | -------------- | 0.9 |
| negative | -------------- | | negative | -------------- | 0.8 |
| negative | -------------- | | negative | -------------- | 0.78 |
| negative | -------------- | | negative | -------------- | 0.1 |
| negative | -------------- | | negative | -------------- | 0.05 |
| negative | -------------- | | negative | -------------- | 0.04 |
| negative | -------------- | | negative | -------------- | 0.03 |

ADAPTIVE SELF-ADVERSARIAL NEGATIVE SAMPLING FOR GRAPH NEURAL NETWORK TRAINING

CROSS REFERENCE TO RELATED APPLICATIONS

The present application is a related Application of co-pending U.S. patent application Ser. No. 17/161,933, which was concurrently filed herewith on Jan. 29, 2021, the entire contents of which are incorporated herein by reference.

BACKGROUND

The present invention relates generally to a graph neural network (GNN) training method for a link prediction task, and more particularly, but not by way of limitation, to a system, method, and computer program product for an end-to-end solution for a graph neural network (GNN) training in heterogeneous, multi-relational graphs, and more particularly, for addressing two building blocks in a pipeline, namely heterogeneous graph representation learning and negative sampling.

The expressivity of a learned representation depends on a quality of negative samples used during training. Although existing hard negative sampling techniques may identify challenging negative relationships for optimization, new techniques are required to control false negatives during training as false negatives could corrupt the learning process.

Most conventional graph representation learning methods can be unified within a sampled noise contrastive estimation framework, especially for a link/relationship prediction task. Random negative sampling has been widely adopted for its simplicity and efficiency. However, random negative sampling suffers seriously from a vanishing gradient problem as most negative samples can be easily classified.

Generative adversarial network (GAN)-based solutions are also proposed for addressing this issue. Using a GAN, the generator acts like a negative sampler to identify challenging relationships for a discriminator to learn. However, the GAN-based solutions have more parameters and are generally difficult to train leading to increased costs.

Recently, a new technique has considered exploiting the model itself to identify challenging negative samples. These proposed new models work under an assumption that a hardness of a negative sample is proportional to an error it causes. Despite an increase in performance, the new techniques still struggle with a problem of over-training on false negatives as the training progresses. Thus, the negative samples that cause extremely high errors would not be trustworthy, especially in missing link/relationship prediction scenarios.

Thereby, a challenging technical problem is created in the conventional techniques for how to balance an exploitation of hard negative samples and avoid false negatives since a clear-cut boundary between them does not exist. Moreover, decision boundaries could vary from case to case due to a heterogeneity of graphs failing simple uniform thresholding approaches.

SUMMARY

Thus, the inventors have considered a technical solution to the technical problem in the conventional techniques by introducing a parameter-free negative sampling technique, namely, adaptive self-adversarial (ASA) negative sampling. ASA negative sampling reduces a false negative rate by leveraging positive relationships to effectively guide an identification of true negative samples. Thereby, a practical application is obtained via an implementation of the technical solution in that missing links in a knowledge graph can be predicted to increase revenue of, for example, a contract supplying corporation that learns new potential contracts via the predicted links.

In an exemplary embodiment, the present invention can provide a computer-implemented graph neural network (GNN) training method with a graph neural network, the method including selecting and using negative samples, via an Adaptive Self-Adversarial (ASA) negative sampling algorithm based on the self-adversarial negative sampling method, which cause high gradients to a model for training in a next optimization iteration.

In another exemplary embodiment, the present invention can provide a computer program product for graph neural network (GNN) training with a graph neural network, the computer program product comprising a computer-readable storage medium having program instructions embodied therewith, the program instructions executable by a computer to cause the computer to perform selecting and using a negative sample, via an Adaptive Self-Adversarial (ASA) negative sampling algorithm based on self-adversarial negative sampling method, which causes a high gradient to a model for training in a next optimization iteration.

In a third exemplary embodiment, the present invention can provide a graph neural network (GNN) training system with a graph neural network, said system including a processor, and a memory, the memory storing instructions to cause the processor to perform selecting and using a negative sample, via an Adaptive Self-Adversarial (ASA) negative sampling algorithm based on self-adversarial negative sampling method, which causes a high gradient to a model for training in a next optimization iteration.

In another exemplary embodiment, the present invention can provide a computer-implemented method of using a computing device to determine a connectivity between a plurality of nodes via edges using a graph neural network (GNN), the method including generating, by a computing device, one or more hypothetical edges between two or more nodes of a plurality of nodes of a graph neural network, testing, by the computing device, to determine whether the one or more generated hypothetical edges should be connected by using negative sampling, and permanently connecting, by the computing device, the one or more tested hypothetical edges if the negative sampling indicates the connectivity.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 4 exemplarily depicts Adaptive Self-Adversarial (ASA) negative sampling including how a negative sample is selected using the scores of the positive samples and negative samples;

FIG. 5 exemplarily depicts a pooling technique to reduce the sampling space;

FIG. 6 exemplarily depicts a pseudocode for a training Strategy with the ASA negative sampling method;

FIG. 8 exemplarily depicts the ASA solution for the negative sampling;

DETAILED DESCRIPTION

Figure 1:
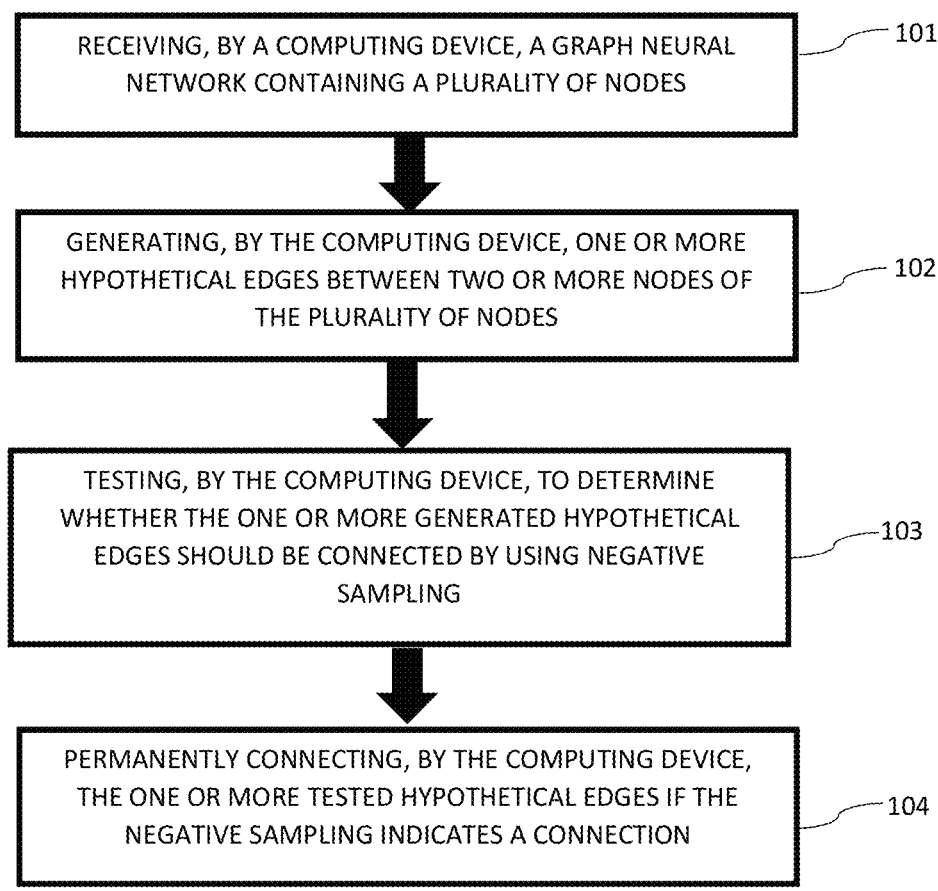
FIG. 1 exemplarily shows a high-level flow chart for a graph neural network (GNN) training method 100.

The invention will now be described with reference to FIG. 1-12, in which like reference numerals refer to like parts throughout. It is emphasized that, according to common practice, the various features of the drawing are not necessarily to scale. On the contrary, the dimensions of the various features can be arbitrarily expanded or reduced for clarity.

It is noted that "ASA negative sampling method" refers to the methodology described herein and "ASA negative sampler" refers to the program or component built based on the method.

With reference now to the exemplary method 100 depicted in FIG. 1, to capture a dynamic distribution of negative samples during training, the graph neural network (GNN) training method 100 includes various steps for an adaptive self-adversarial (ASA) negative sampling technique that shares a same general principle with a random negative sampling idea. However, the inventive ASA negative sampler of method 100 does not suffer from a vanishing gradient problem often occurring to a random negative sampler and also works more efficiently in terms of computational costs, as compared to prior techniques. As shown in at least FIG. 10, one or more computers of a computer system 12 according to an embodiment of the present invention can include a memory 28 having instructions stored in a storage system to perform the steps of FIG. 1.

The graph neural network (GNN) training method 100 according to an embodiment of the present invention may act in a more sophisticated, useful and cognitive manner, giving the impression of cognitive mental abilities and processes related to knowledge, attention, memory, judgment and evaluation, reasoning, and advanced computation.

A system can be said to be "cognitive" if it possesses macro-scale properties-perception, goal-oriented behavior, learning/memory and action—that characterize systems (i.e., humans) generally recognized as cognitive.

Although one or more embodiments (see e.g., FIGS. 10-12) may be implemented in a cloud environment 50 (see e.g., FIG. 11), it is nonetheless understood that the present invention can be implemented outside of the cloud environment.

With reference generally to FIGS. 1-9, to capture a dynamic distribution of the negative samples during training, the inventive ASA algorithm makes use of a trained model from a prior iteration (i.e., a last round of training where the model is trained multiple rounds and ASA uses a resulted model from a last round to score the negative samples) to evaluate a "hardness" of a generated negative sample (i.e., a higher a gradient it causes, a harder a sample is to the model). In other words, a hard negative sample ("hardness") refers to a set of true negative samples from which the model gains good discriminative power.

To overcome a false negative issue in the conventional techniques, the inventive ASA negative sampler also evaluates and considers a hardness of positive samples. Since the negative samples are derived from an existing relationship, the level of confidence of the model on the positive sample should match its level of confidence on a negative sample. If a gradient caused by a negative sample is greater than that caused by a positive sample, then that particular sample could be a false negative, and therefore should be avoided.

The invention utilizes a negative sampling algorithm based on the self-adversarial negative sampling idea. The method 100 selects and uses the negative samples of which cause high gradients to the model for training in a next optimization iteration.

The method 100 uses the positive samples to offset the hardness of the negative samples during the selection process to reduce the false negative cases (e.g., as discussed with equation (4) below). And, to reduce a complexity of the ASA negative sampling method, the invention reduces a selection space by uniformly sampling a pool of candidates from all possible negative links between edges of nodes while making use of a graph schema to reduce a negative sample space which filters out link(s) which is/are incompatible with the graph schema.

Moreover, a set of decay functions is used for the ASA negative sampling method to automatically increase the hardness threshold as the training progresses. As discussed in more detail later, a training strategy involving ASA negative sampling method for the entire GNN training life-cycle is preferably used.

More specifically, negative sampling is a technique to approximate a softmax function with a huge output layer. A "huge output layer" is a very high dimensional output vector. In the context of graph, if one does not use negative sampling, the GNN needs to have a output layer which has dimension equal to the number of nodes in the graph. This is based on an idea of a noise contrastive estimation which says that a good model should differentiate positive signals from negative ones. Negative sampling has been adapted to graph learning problems especially where the learning objective involves predicting relations between nodes via equation (1):

$$\arg\min \sum\nolimits_{(v_i, r, v_j) \in E} [\ell(+1, d_r(f(v_i), f(v_j))) + \ell(-1, d_r(f(\bar{v}_m), f(\bar{v}_n)))], \quad (1)$$

where θ denotes the model parameters, l is usually defined as cross entropy, $\bar{v}_m$, $\bar{v}_n \in V$ are parts of a negative relationship sample, i.e. $(\bar{v}_m, r, \bar{v}_n) \notin E$, f refers to a graph embedding network, and $d_r$ is a scoring function. $d_r$ is defined as a factorization which can be replaced by other relation learning models as long as it learns embeddings for relations according to equation (2):

$$d_r(f(v_i), f(v_j)), \quad (2)$$

where $M_r \in \mathbb{R}^{d \times d}$ is a diagonal matrix associated with $r \in R$. $h_r$ is the diagonal of $M_r$. Indeed, there exists a $d_r$ and it can be altered depending on how one would like to score the edge.

A negative sample in a context of a relationship prediction is normally generated by altering one of the nodes of an existing edge while keeping the relation type fixed, e.g. $(v_i, r, \bar{v}_n) \notin E$ or $(\bar{v}_m, r, v_j) \notin E$. Random negative sampling is commonly adopted due to its simplicity and efficiency. In other words, every unobserved edge (no edge) is a negative sample. Random negative sampling is randomly selecting a subset of all possible unobserved edges for model training.

Figure 7:
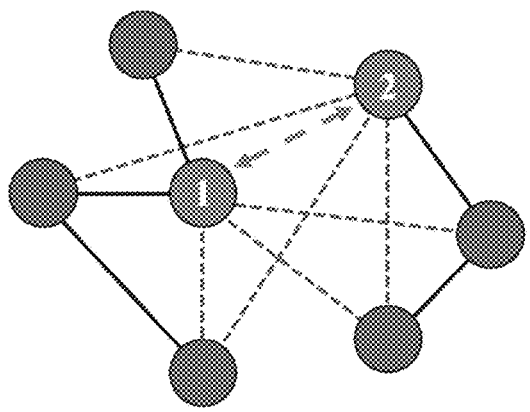
FIG. 7 exemplarily depicts a negative sampling and the problem associated therewith.

It is noted that all the non-existing edges are possible negative samples which can be identified by looking at what the presented edges are, such as shown in FIG. 7. FIG. 7 shows the negative samples w.r.t. a positive sample (edge between 1 and 2). The negative samples can be classified into three categories. The "simple negative sample" refer to the samples that can be easily predicted by GNN therefore causes the problem of vanishing gradient (GNN does not make much mistake on these samples therefore it learns nothing). The "false negative" refer to the samples, which indeed should be predicted as edges (missing links, e.g. product recommendation). Feeding them as negative samples to model training will confuse the model. The "hard negative sample" refer to real negative samples, which cannot be easily predicted by the model. In another word, the model will learn a lot from the hard negative samples. The invention focuses on identifying the hard negative samples from all possible negative samples.

However, some techniques have shown that only a small subset of all possible negative samples are useful for training while most of the negative samples are trivial cases from which the model does not gain much discriminative power.

Recently, GAN-based solutions have attracted a lot of attention for this particular problem. The idea is to use a generator as a negative sampler to generate hard negative relationships for the discriminator. However, GAN-based solutions introduce more parameters and are generally difficult to train. To overcome the computational barrier, the ASA negative sampling method has been proposed. The core idea is to use the model (i.e., the trained graph neural network from the last training iteration) itself to evaluate the hardness of negative samples (i.e., when using the stochastic gradient descent algorithm for optimization, a negative sample with a high gradient for the current model is a hard negative sample).

Let $d_r'$ and $f'$ be the scoring and embedding function trained from a previous iteration, then for a relationship $(v_i, r, v_j) \in E$, the negative sample selection is defined as:

$$\{\bar{v}_m \arg \max \; d_r'(f'(\bar{v}_m), f'(\bar{v}_n)), \quad (3)$$

meaning that the negative sample which is predicted as a positive relationship with a high score is preferred to be used in a current training process. To reduce the computational cost of evaluating every possible negative sample to optimize, Equation 3 is used.

To tackle this, the invention utilizes the ASA negative sampling method 100. Since a negative sample is a variation of the positive relationship, the idea is to make use of the positive relationship during the evaluation to control a hardness accordingly. Specifically, the invention via method 100 alters a selection strategy from Equation 3 to:

$$\{\bar{v}_m \arg \; \min |d_r'(f'(v_i), f'(v_j)) - d_r'(f'(\bar{v}_m), f'(\bar{v}_n)) - \mu|,\}, \quad (4)$$

where μ is a positive constant.

Instead of forcing a selection towards a hardest negative sample, the ASA selects a negative sample with moderate difficulty by considering the score on the respective positive sample. That is, a score of a selected negative sample may not be higher than the score of a positive relationship from which it is derived. The implication is that the negative sample with score higher than its respective positive relationship can be a false negative.

Figure 2:
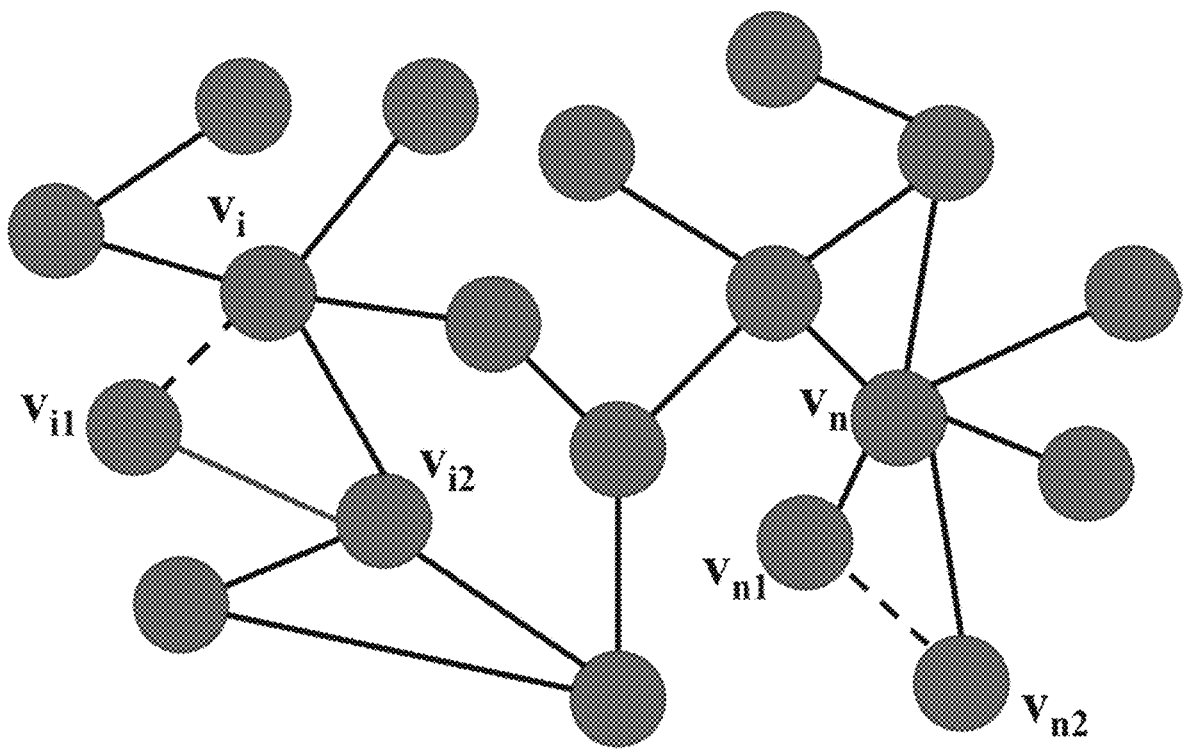
FIG. 2 exemplarily depicts an exemplary graph for the graph neural network (GNN) training method 100.

This can be explained with reference to FIG. 2. In FIG. 2, let the edge between $v_{n1}$ and $v_{n2}$ be an unobserved edge in the original graph. By definition, an unobserved edge is a negative sample. The (missing) link prediction task is to predict additional edges in the input graph. Let's say indeed there should be an edge between $v_{n1}$ and $v_{n2}$ (e.g. $v_{n1}$ is a company "foo" and it should buy a product "xyz" (node $v_{n2}$)). Therefore, after knowing such "ground truth", one now knows that the unobserved edge $v_{n1}$ and $v_{n2}$ is a false negative. For example, a false negative can be determined by knowing the ground truth. However, such ground truth does not exist in reality. Therefore, the problem of avoiding false negative is challenging.

The invention also introduces a margin as a hyperparameter to further control the hardness—the higher the μ, the easier the case. The margin is used to evaluate the final score of the negative sample. Such as is shown in FIG. 4, the ASA sampling method select the negative sample based on the absolute difference between the score of a negative sample and its respective positive sample. The smaller the difference the higher chance of being selected. In a case where the user wants to selected "easier sample", the selection will in favor of those negative samples, which has score differences equal to this threshold. The larger the threshold, the larger the difference and the easier the sample.

Different decay functions, (e.g., exponential and linear decay function for μ) are used to increase the hardness as the training progresses.

With reference back to FIGS. 2, 3, and 7, a graph neural network is depicted with nodes, edges, and connections between the edges of the nodes (and possible connections). The positive samples described above refer to the existing links in the graph, and the negative samples refer to the non-existing links in the graph. The model is usually trained using a small portion of all the possible negative samples. As discussed above, if the selected negative samples are trivial then this is a vanishing gradient. Conversely, if the selected negative samples are hard, then this is a false negative (e.g., missing link(s)). Thus, there is needed a middle ground (exploration vs. exploitation).

For example, a practical application using the inventive approach is implemented when an input of a purchase transaction graph is received. In the purchase transaction graph, the nodes represent buyers and products, and the edges represent purchase relationships. The practical application is to learn (i.e., produce) a graph neural model that can recommend purchase opportunities (i.e., new edges).

In other words, the invention determines what negative samples (e.g., unobserved purchases) from the input graph to choose for effective and efficient model training. The challenge that is overcome via the inventive technique is avoiding selecting false negative (e.g., unobserved purchases that should be recommended) and trivial negative samples from which the model does not learn much.

With reference to FIG. 2 and to explain the practical application that is obtained via implementation of the inventive method 100, $V_i$ is a node representing, for example, a first product. $V_{i2}$ is a second company that is connected to the first product (i.e., the second company uses the first product). $V_{i1}$ is a node of a first company that is related to the second company (e.g., in a same industry).

The method 100 identifies possible connection(s) between $V_{i1}$ and $V_i$ such that the product can be sold to $V_{i1}$ based on generating the hypothetical connection between the edges of $V_{i1}$ and $V_i$ according to the correlation caused by $V_{i1}$ and $V_{i2}$ being connected. Thereby, $V_{i1}$ and $V_i$ are permanently connected because these two links look more similar to the existing positive samples than the other unobserved links fed into the training process.

Indeed, the idea is that the trained GNN should be able to tell what should be linked and what should not be linked. In order to let GNN gain such power, the invention provides thee GNN positive samples (links in the input graph) and negative samples (unobserved links) to learn. The learning performance is measured by how much mistake the GNN made on the given samples. And the GNN will be updated (via back propagation) based on the mistake measurement.

There is nothing we can do about positive samples. Edge is edge, there is no false edge (we assume). However, not all unobserved edges are good for learning (as you already described).

Similarly, the node of $V_n$ represents a product and the product is provided to each of $V_{n1}$ and $V_{n2}$. The invention determines that $V_{n1}$ and $V_{n2}$ should be connected based on receiving the same product.

Figure 3:
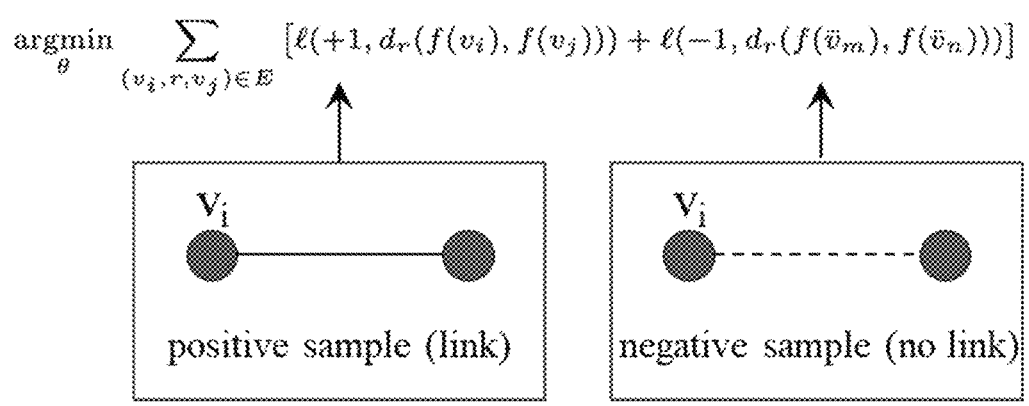
FIG. 3 exemplarily depicts a negative sampling approach via a noise contrastive estimation.

As referenced above, the link is found via a positive sample (i.e., a link existing) and a negative sample (i.e., no link) as shown in FIG. 3. The invention uses the algorithm as described above to factor the links.

With reference to FIG. 4, the negative sampling algorithm based on the ASA negative sampling method idea is implemented to select and use the negative samples, which cause high gradients to the model for training in the next optimization iteration. The positive samples are used to offset the hardness of the negative samples during the selection process to reduce the false negative cases.

A negative sample $s_n$ is generated by corrupting one of the nodes in a positive sample $s_p$. The selection of the corrupting node is made by argmin |score (sp)−score (sn)−c|, where c is a constant.

The variable "c" is a threshold value to adjust how difficult the selected samples would be for the model. The smaller the c, the more difficult the selected samples are. The variable "c" can be a constant or can be decreased as the training progresses. The idea of having a relatively higher "c" and decreasing it over time is to start the training with easier cases and force the training to focus more on the challenging cases later. By doing such, the model is able to solve both easy and challenging cases during inference. As discussed above with reference to equation (4), instead of forcing the selection towards the hardest negative sample, the ASA sampler selects a negative sample with moderate difficulty by considering the score on the respective positive sample. That is, the score of a selected negative sample may not be higher than the score of the positive relationship from which it is derived. The implication is that the negative sample with score higher than its respective positive relationship can be a false negative. The margin $\mu$ is also introduce as a hyperparameter to further control the hardness—the higher the $\mu$ the easier the case.

Thereby, the invention adopts two decay functions to decrease c; namely linear decay and exponential decay. The invention provides the option to make c constant or decay over time (e.g., training epoch).

With reference to FIG. 5, FIG. 5 shows the pooling technique in which not every possible negative sample legitimate. If the graph schema says a "purchase" link must include a company node and a product node, one does not ever select two product nodes to compose a "purchase" negative sample.

Figure 9:
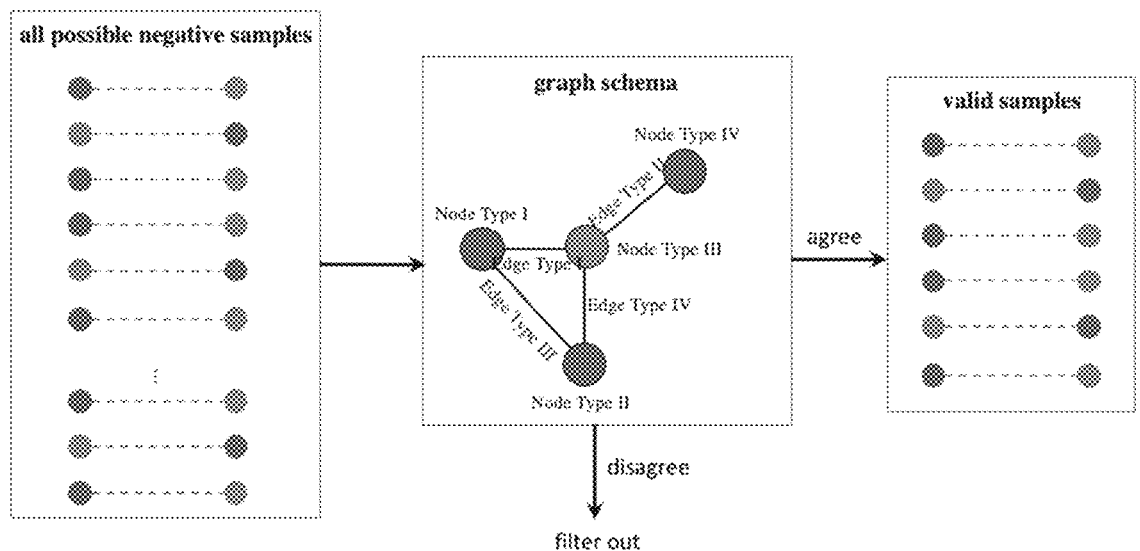
FIG. 9 exemplarily depicts a graph Schema-aware subsampling technique.

With reference to FIG. 9, graph schema-aware subsampling is illustrated. To reduce the complexity of the ASA (e.g., because computing a score for each and every possible negative sample is too computationally expensive), the invention reduces the selection space by uniformly sampling a pool of candidates from all possible negative links and it is experimentally proved that ASA is less sensitive to the pool size.

The invention makes use of the graph schema to reduce the sampling space by only considering the negative samples which comply with the graph schema. For example, if a product node can only link to a consumer, then a negative link that connects two products should not be considered at all. The invention also randomly samples a small pool of negative samples from the reduced space and performs ASA selection only from the samples in the pool.

Also, an ASA sampler can be used that includes a self-paced learning strategy with ASA according to the pseudo-code that is depicted in FIG. 6.

With reference to the pseudocode, the training process starts by first initializing the GNN model. The process involves multiple training iterations (epoch). In line 3, the code generates the representation of each node. In line 4, in early on (epoch<threshold), the training involves random negative sampling which aims to let the model quickly learn the easy cases. In line 6, the ASA negative sampler will be triggered aiming to feed more challenging samples for the GNN to learn. The ASA sampler uses the model G (trained from the last iteration), node embedding E, margin (c) and a decay option. If the decay option is enabled, the margin will control the hardness and make the samples goes from easy to hard as the training progress. In line 8, given the positive sample and negative samples, measure how much mistake GNN makes on these samples. In line 9, the code computes and decides how the GNN should be updated (backprop). And, in line 10 the model is updated. Lines 8-10 are a stomatitis gradient decent process.

With reference to FIG. 1, FIG. 1 depicts an overall method 100 of using a computing device to determine whether or not nodes should be connected via edges in a graph neural network (GNN). In step 101, a graph neural network containing a plurality of nodes is received (or is simply made available for use).

In step 102, one or more hypothetical edges between two or more nodes of the plurality of nodes are generated. In step 103, testing is performed to determine whether the one or more generated hypothetical edges should be connected by using negative sampling. And, in step 104, the one or more tested hypothetical edges are connected permanently if the negative sampling indicates that they should be.

Thus, as one practical application, the invention is able to identify potential new sales in a graph neural network based on connections and unknown connections between different nodes to improve sales for a company. The invention is not limited to this practical application, but can be used a variety of other applications including drug discovery, fraud detection, social network analysis biology network analysis.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
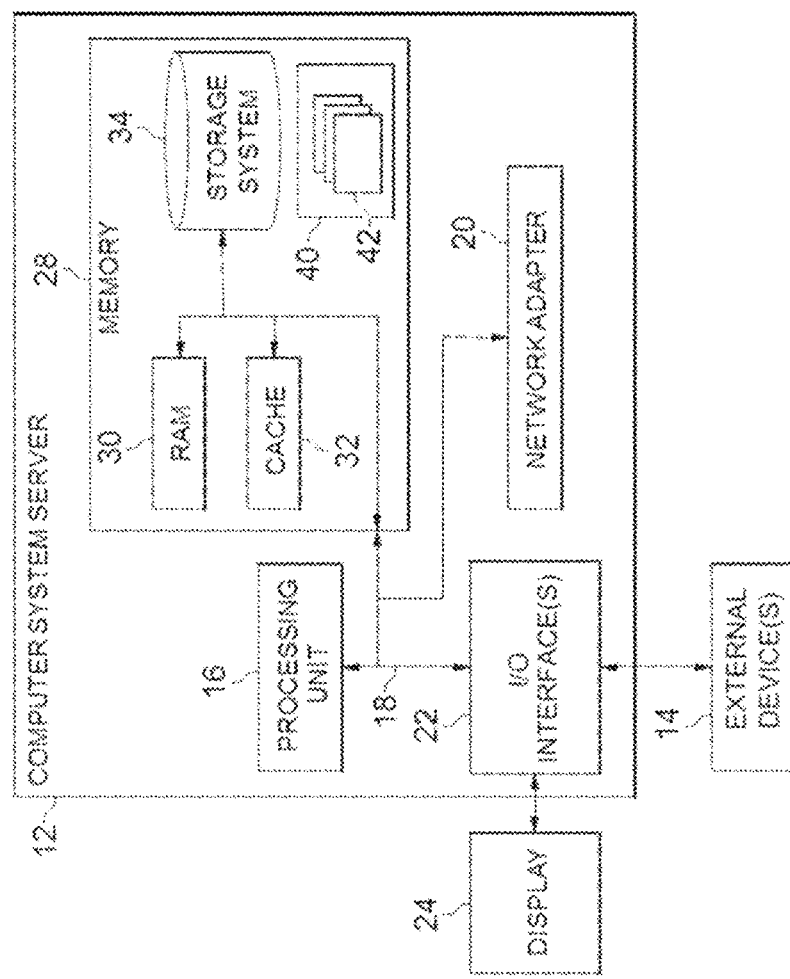
FIG. 10 depicts a cloud computing node 10 according to an embodiment of the present invention.

Referring now to FIG. 10, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 10, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 11:
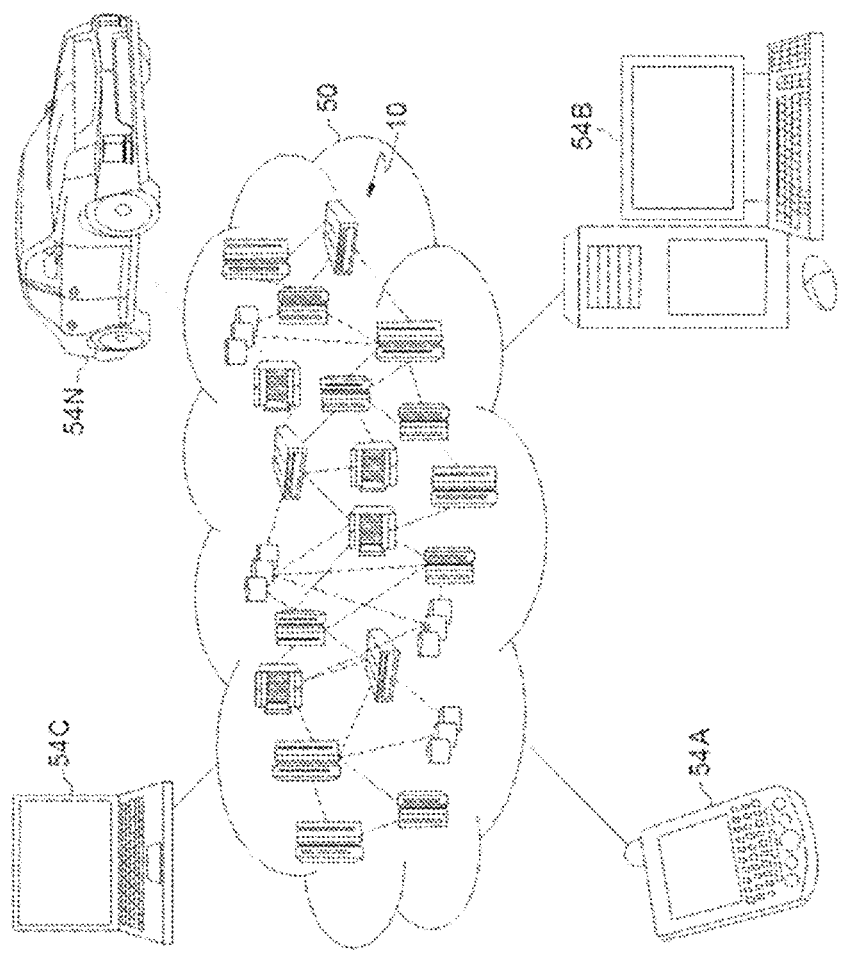
FIG. 11 depicts a cloud computing environment 50 according to an embodiment of the present invention.

Referring now to FIG. 11, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 11 are intended to be illustrative only and that computing nodes 10 and cloud computing environment 50 can communicate with any type of computerized circuit over any type of network and/or network addressable connection (e.g., using a web browser).

Figure 12:
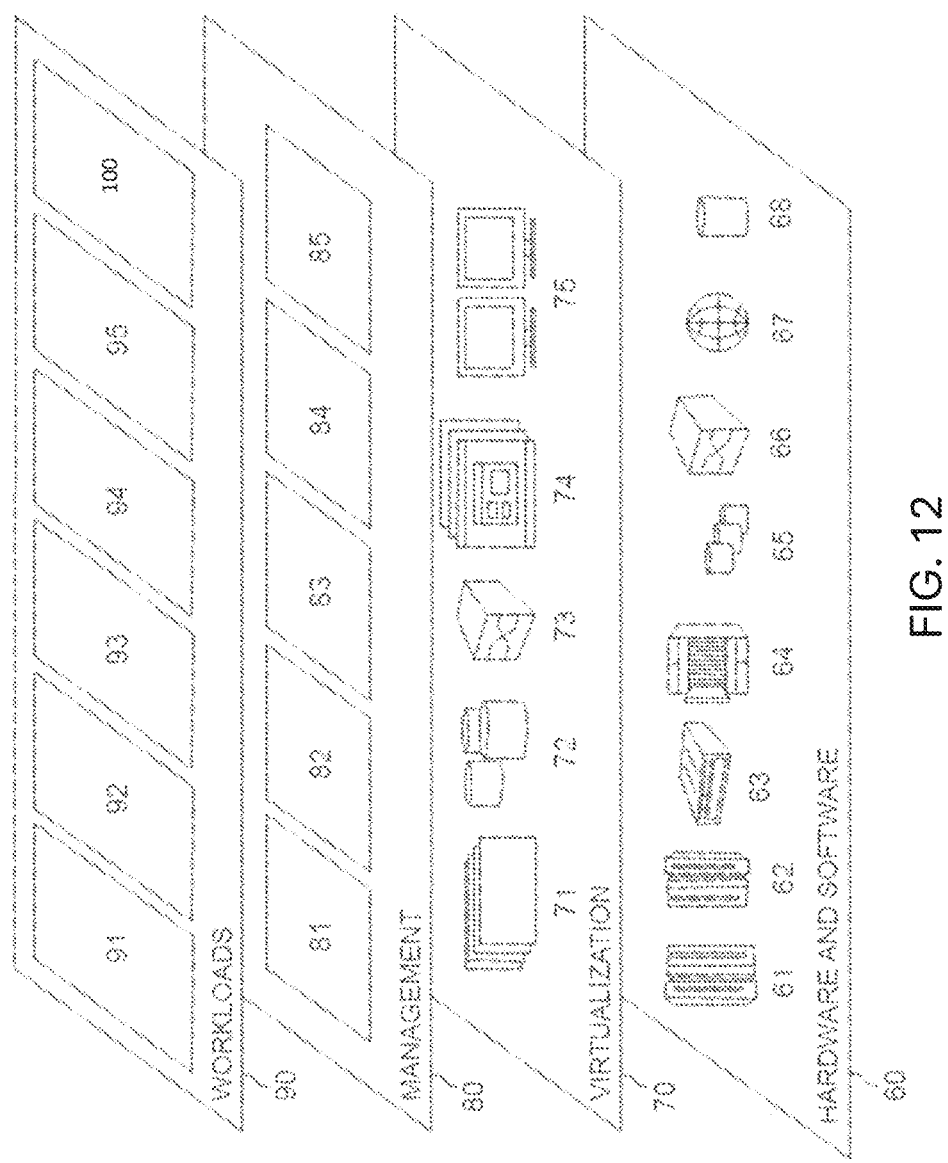
FIG. 12 depicts abstraction model layers according to an embodiment of the present invention.

Referring now to FIG. 12, an exemplary set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the graph neural network (GNN) training method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented graph neural network (GNN) training method, comprising:
   training a model in a first training iteration of the GNN;
   evaluating, using the trained model, a gradient caused by a negative sample of a plurality of negative samples;
   evaluating, using the trained model, a gradient caused by a positive sample, wherein the positive sample corresponds to the negative sample;
   classifying, using the trained model, the negative sample as a hard negative sample based on:
      the negative sample causing a high gradient to the trained model for training in a next training iteration, and
      the gradient caused by the negative sample being not higher than the gradient caused by the corresponding positive sample, wherein the corresponding positive sample is used during the classifying to offset a hardness of the negative sample to reduce false negative cases;
   selecting the negative sample among the plurality of negative samples, via an Adaptive Self-Adversarial (ASA) negative sampling algorithm based on:
      self-adversarial negative sampling,
      the first training iteration of the GNN, and
      the negative sample being classified as the hard negative sample, wherein a set of decay functions for the ASA automatically increases a threshold of the hardness for the next training iteration relative to the first training iteration; and
   training the GNN in the next training iteration using the selected negative sample.

2. The computer-implemented GNN training method of claim 1, further comprising uniformly sampling a pool of candidates from possible negative links in the GNN, for reducing a selection space.

3. The computer-implemented GNN training method of claim 2, wherein a graph schema is defined to reduce a negative sample space which filters out a link in the GNN which is incompatible with the graph schema.

4. The computer-implemented GNN training method of claim 1, further comprising utilizing a training strategy for the ASA during an entire GNN training life-cycle.

5. The computer-implemented GNN training method of claim 1, wherein the computer-implemented GNN training method is embodied in a cloud-computing environment.

6. A computer program product for graph neural network (GNN) training, the computer program product comprising a computer-readable storage medium having program instructions embodied therewith, the program instructions executable by a computer to cause the computer to perform:
   training a model in a first training iteration of the GNN;
   evaluating, using the trained model, a gradient caused by a negative sample of a plurality of negative samples;
   evaluating, using the trained model, a gradient caused by a positive sample, wherein the positive sample corresponds to the negative sample;
   classifying, using the trained model, the negative sample as a hard negative sample based on:
      the negative sample causing a high gradient to the trained model for training in a next training iteration, and
      the gradient caused by the negative sample being not higher than the gradient caused by the corresponding positive sample, wherein the corresponding positive sample is used during the classifying to offset a hardness of the negative sample to reduce false negative cases;
   selecting the negative sample among the plurality of negative samples, via an Adaptive Self-Adversarial (ASA) negative sampling algorithm based on:
      self-adversarial negative sampling,
      the first training iteration of the GNN, and
      the negative sample being classified as the hard negative sample, wherein a set of decay functions for the ASA automatically increases a threshold of the hardness for the next training iteration relative to the first training iteration; and
   training the GNN in the next training iteration using the selected negative sample.

7. The computer program product of claim 6, further comprising uniformly sampling a pool of candidates from possible negative links in the GNN, for reducing a selection space.

8. The computer program product of claim 7, wherein a graph schema is defined to reduce a negative sample space which filters out a link in the GNN which is incompatible with the graph schema.

9. The computer program product of claim 6, further comprising utilizing a training strategy for the ASA during an entire GNN training life-cycle.

10. The computer program product of claim 6, wherein the computer program product is embodied in a cloud-computing environment.

11. A graph neural network (GNN) training system, comprising:
a processor; and
a memory, the memory storing instructions to cause the processor to:
train a model in a first training iteration of the GNN;
evaluate, using the trained model, a gradient caused by a negative sample of a plurality of negative samples;
evaluate, using the trained model, a gradient caused by a positive sample, wherein the positive sample corresponds to the negative sample;
classify, using the trained model, the negative sample as a hard negative sample based on:
the negative sample that causes a high gradient to the trained model to train in a next training iteration, and
the gradient caused by the negative sample being not higher than the gradient caused by the corresponding positive sample, wherein the corresponding positive sample is used during the classifying to offset a hardness of the negative sample to reduce false negative cases;
select the negative sample among the plurality of negative samples, via an Adaptive Self-Adversarial (ASA) negative sampling algorithm based on:
self-adversarial negative sampling,
the first training iteration of the GNN, and
the negative sample being classified as the hard negative sample, wherein a set of decay functions for the ASA automatically increases a threshold of the hardness for the next training iteration relative to the first training iteration; and
train the GNN in the next training iteration using the selected negative sample.

12. The GNN training system of claim 11, wherein the memory further stores instructions to cause the processor to:
uniformly sample a pool of candidates from possible negative links in the GNN, for reducing a selection space.

13. The GNN training system of claim 12, wherein a graph schema is defined to reduce a negative sample space which filters out a link in the GNN which is incompatible with the graph schema.

14. The GNN training system of claim 11, wherein the memory further stores instructions to cause the processor to utilize a training strategy for the ASA during an entire GNN training life-cycle.

15. The GNN training system of claim 11, wherein the GNN training system is embodied in a cloud-computing environment.

16. A computer-implemented graph neural network (GNN) training method, comprising:
training a model in a first training iteration of the GNN;
evaluating, using the trained model, a gradient caused by a negative sample of a plurality of negative samples;
evaluating, using the trained model, a gradient caused by a positive sample, wherein the positive sample corresponds to the negative sample;
classifying, using the trained model, the negative sample as a hard negative sample based on:
the negative sample causing a high gradient to the trained model for training in a next training iteration, and
the gradient caused by the negative sample being not higher than the gradient caused by the corresponding positive sample, wherein the corresponding positive sample is used during the classifying to offset a hardness of the negative sample to reduce false negative cases;
selecting the negative sample among the plurality of negative samples, via an Adaptive Self-Adversarial (ASA) negative sampling algorithm based on;
self-adversarial negative sampling,
the first training iteration of the GNN, and
the negative sample is classified as the hard negative sample, wherein a graph schema is defined to reduce a negative sample space which filters out a link in the GNN which is incompatible with the graph schema; and
training the GNN in the next training iteration using the selected negative sample.

17. The computer-implemented GNN training method of claim 16, wherein the computer-implemented GNN training method is embodied in a cloud-computing environment.

18. A computer-implemented graph neural network (GNN) training method, comprising:
training a model in a first training iteration of the GNN;
evaluating, using the trained model, a gradient caused by a negative sample of a plurality of negative samples;
evaluating, using the trained model, a gradient caused by a positive sample, wherein the positive sample corresponds to the negative sample;
classifying, using the trained model, the negative sample as a hard negative sample based on:
the negative sample causing a high gradient to the trained model for training in a next training iteration, and
the gradient caused by the negative sample being not higher than the gradient caused by the corresponding positive sample;
selecting the negative sample among the plurality of negative samples, via an Adaptive Self-Adversarial (ASA) negative sampling algorithm based on:
self-adversarial negative sampling,
the first training iteration of the GNN, and
the negative sample is classified as the hard negative sample; and
training the GNN in the next training iteration using the selected negative sample.

19. The computer-implemented GNN training method of claim 18, wherein the computer-implemented GNN training method is embodied in a cloud-computing environment.

* * * * *